Patented May 14, 1946

2,400,475

UNITED STATES PATENT OFFICE 2,400,475

FOLDING MACHINE

Christopher P. Tong and John W. May, Durham, N. C., assignors to Wright's Automatic Machinery Company, Durham, N. C., a corporation of North Carolina Application July 14, 1943, Serial No. 494,674

11 Claims. (Cl. 223—37)

This invention relates to a folding machine and more particularly to apparatus for folding elongated flexible articles about a filler or stiffening member such as a piece of cardboard to prepare the article for a packing or wrapping operation.

The apparatus of the present invention is particularly applicable to the folding of hosiery but may obviously be employed for the folding of any elongated article made of cloth or similar flexible material. In general, the machine of the present invention folds hosiery or other similar articles about a filler or stiffening member such as a piece of cardboard as fast as two operators can position the articles upon a feed table. The filler member is employed as a folding instrumentality and inserts a portion of the article in partially folded condition in a resilient pocket preferably mounted upon a rotating turret. Rotation of the turret in conjunction with other folding mechanism completes the folding operation, the folded article with its filler piece then being smoothed and discharged from the turret pocket at a turret position spaced from that at which the article is originally partially inserted in the turret pocket. The entire folding operation is entirely automatic after the articles have been correctly positioned upon a feed table and the folded articles are discharged from the machine in condition to be fed directly to a wrapping machine or to suitable packaging apparatus.

It is, therefore, an object of the present invention to provide improved apparatus for folding elongated flexible articles about a filler member in order to condition the articles for wrapping or packaging.

Another object of the present invention is to provide a machine for folding elongated flexible articles in which a filler member is employed as a folding instrumentality for partially folding the article.

Another object of the invention is to provide an automatic folding machine in which the articles to be folded are alternately placed upon spaced portions of a reciprocating table while the table is stationary and the article then fed into the machine by movement of the table after which the articles are automatically folded about a filler member and discharged from the machine.

Another object of the invention is to provide an improved folding machine which rapidly folds and discharges elongated flexible articles in folded condition suitable for wrapping or packaging.

A further object of the invention is to provide a folding machine employing a reciprocating table providing two spaced portions for receiving articles to be folded in which machine articles previously placed upon one portion of the table are being folded while another article is being positioned upon another portion of the table.

Other objects and advantages of the invention will appear in the following description of a preferred embodiment thereof shown in the attached drawings, of which

General description

Figures 1, 8:
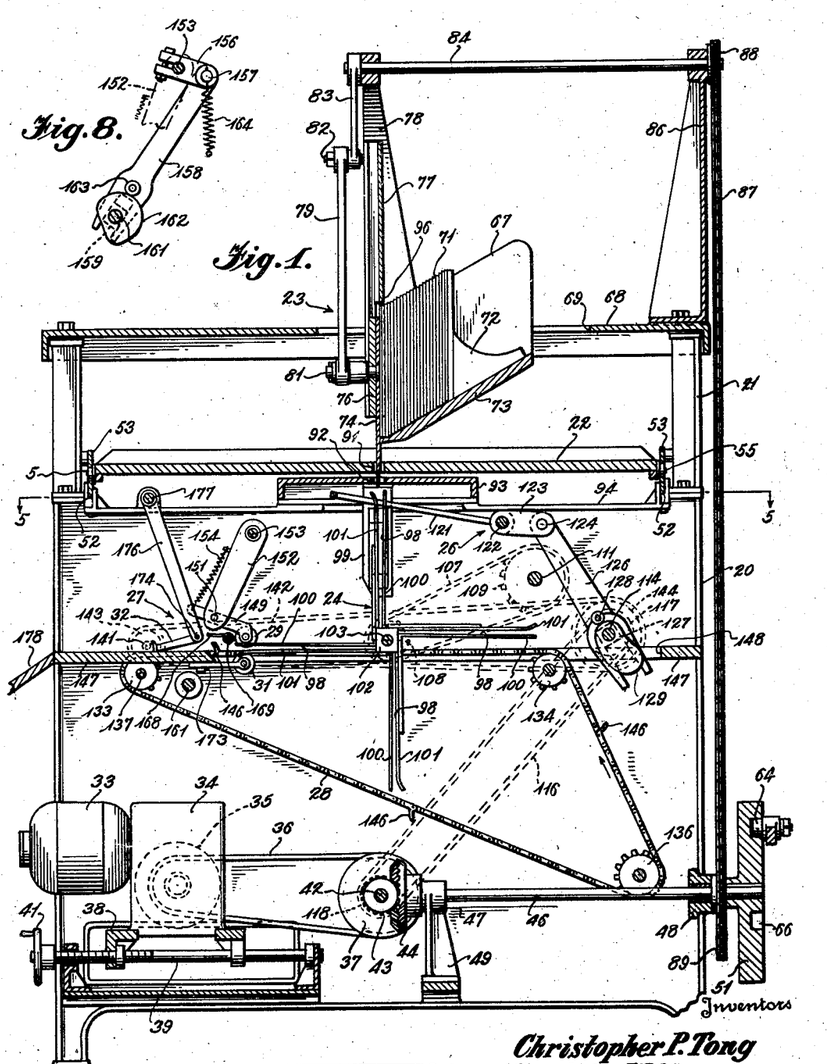
Fig. 1 is a vertical section taken through the machine of the present invention substantially upon the line 1—1 of Fig. 2.
Fig. 8 is a fragmentary view illustrating the operating mechanism for a smoothing roller.

Referring to Fig. 1, the machine of the present invention includes a main frame 20 surmounted by an upper frame 21 secured to the main frame 20. An article feed table 22 is mounted for lateral reciprocation in the upper frame 21. The table 22 is adapted to receive articles to be folded, the articles being manually positioned alternately on opposite portions of the table. A filler member feed mechanism indicated generally at 23 is mounted upon the upper frame 21 and feeds filler members such as strips of cardboard or the like downwardly through the slots in the table 22 to engage the article and form folds therein. A rotating folding turret 24 positioned below the table receives the filler member and the folds in the article which are formed by the filler member. An auxiliary folding mechanism 26 operating in conjunction with the turret 24 during movement thereof completes the folding operation on the article and a discharge mechanism indicated generally at 27 and including discharge chains 28, smoothing and compressing rollers 29 and 31, and discharge pusher 32 smoothes the folded article and discharges it from the machine.

The machine is driven from any suitable source of power such as an electric motor 33 through a speed reducer 34, a pulley 35 and a flexible drive member such as a V-belt 36 engaging the pulley 35 and a variable diameter spring pulley 37 to provide for variable speed control. The motor 33 and speed reducer 34 are preferably mounted upon a sliding carriage 38 for movement toward and away from the pulley 37 by means of a threaded shaft 39 journaled in the frame 20 and provided with a hand wheel 41. The variable diameter pulley 37 is fixedly mounted upon a main drive shaft 42 journaled in side portions of the frame as more clearly shown in Fig. 2. A bevel gear 43 (Fig. 1) is also secured to the shaft 42 and meshes with the bevel gear 44 on a cam shaft 46 journaled in bearings 47 and 48 carried by a bracket 49 and the frame 20, respectively. The cam shaft 46 has rigidly secured thereto a face cam 51 which operates the article feed mechanism including the reciprocating carriage 22.

*Article feed mechanism*

Figure 2:
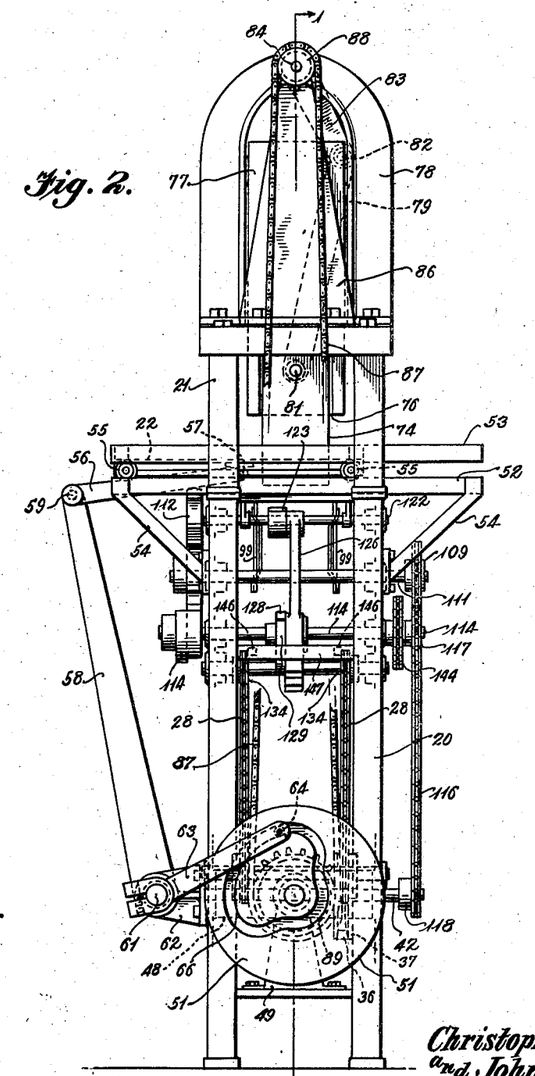
Fig. 2 is an end elevation of the machine.
Figure 7:
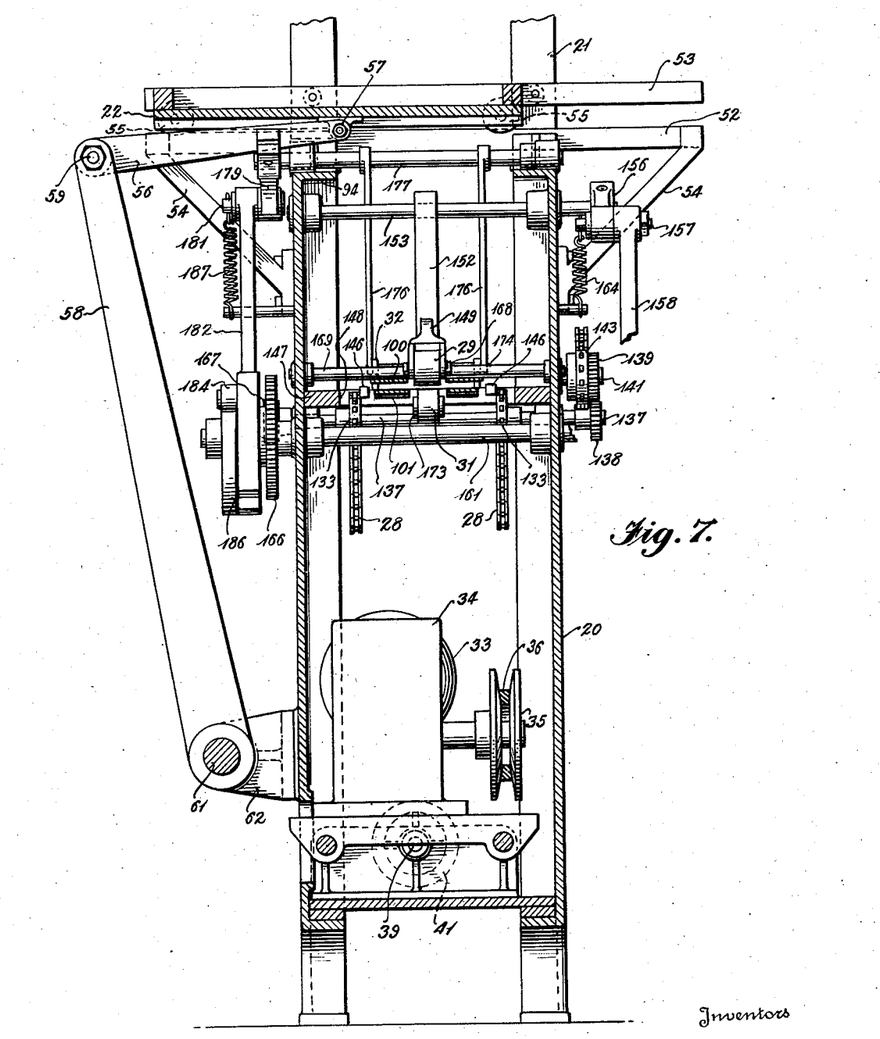
Fig. 7 is a partial vertical elevation taken on the line 7—7 of Fig. 4.

As shown most clearly in Figs. 1, 2, 4 and 7, the feed table 22 is mounted for reciprocation transversely of the machine in lower and upper ways 52 and 53, respectively, secured to the main frame 20 and auxiliary frame 21, respectively, the ends of the lower ways 52 being supported by brackets 54 secured to the frame 20. Flanged rollers 55 rotatably secured to the ends of the table 22 engage the ways 52 and 53 to support and guide the carriage. In the position of the carriage shown in Figs. 2 and 7 an elongated flexible article or articles, such as a pair of hose, may be positioned on the left portion of the table as shown in Figs. 2 and 7 so as to extend longitudinally of the table. Upon lateral reciprocation of the table to the right in these figures a similar article or articles may be positioned upon the right portion of the table so as to extend longitudinally thereof.

The table is reciprocated in timed relation with the other portions of the machine by means of a pair of links 56 each having one end pivotally secured to an end of the table at 57 (Fig. 7). The links 56 also each have their other end pivotally secured to one end of a lever arm 58 at 59. Two lever arms 58 are provided, one being adjacent each end of the table 22. The lever arms 58 are rigidly secured to a rocker shaft 61 extending longitudinally of the machine and journaled in brackets 62 secured to the frame 20. Another arm 63 (Fig. 2) also has one end rigidly secured to the rocker shaft 61 and is provided at its other end with a cam follower roller 64 engaging in a cam groove 66 in the face cam 51. It will be apparent that rotation of the cam 51 will reciprocate the table 22 from side to side and that the form of the cam groove is such as to hold the table in stationary or "dwell" position for a predetermined time in its extreme positions. During the time that the table is maintained stationary in one position, one portion of the table is centered in the machine for a folding operation. Also during this time an operator can position an article or articles to be folded upon the projecting portion of the table and at the same time the machine removes from the center portion of the table and folds an article previously positioned upon the table. The removal of the article from the table and part of the folding operation is accomplished by the filler member feeding mechanism.

*Filler member feeding mechanism*

Figure 3:
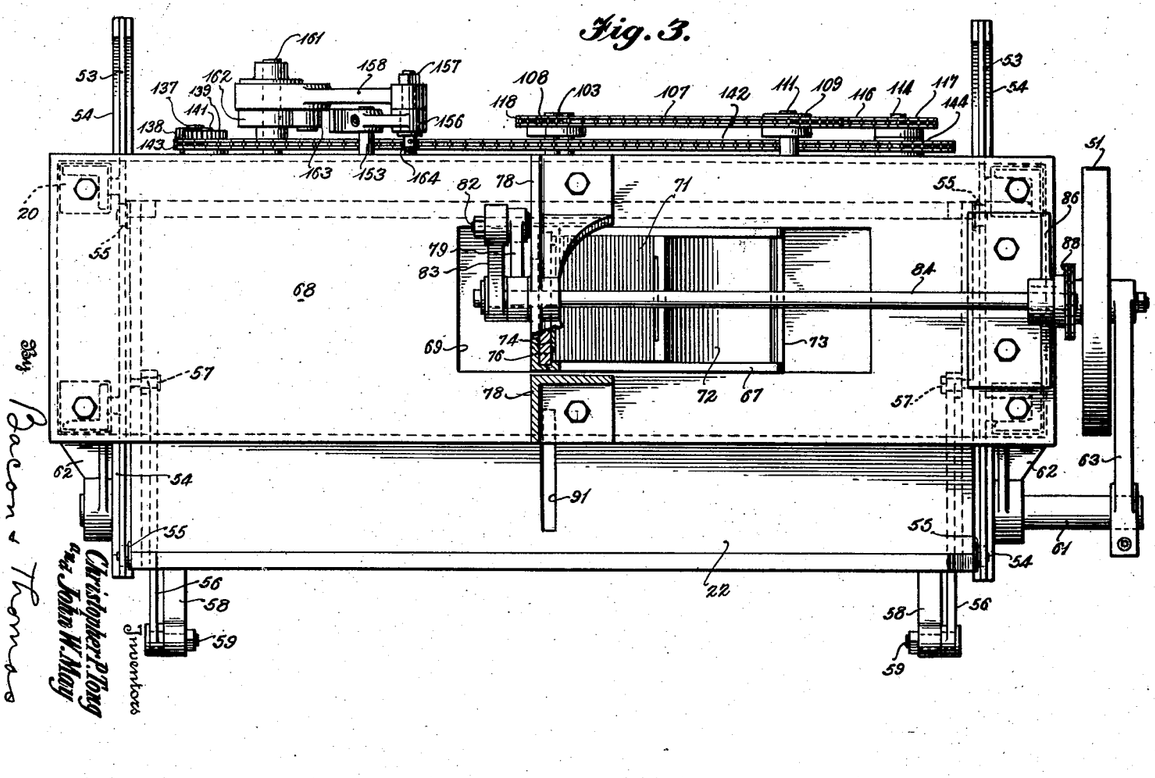
Fig. 3 is a plan view of the machine with certain parts broken away.

As shown most clearly in Figs. 1 and 3, a hopper 67 for filler members is suitably secured in any desired manner to an upper cover member 68 supported by the frame 21 and extends downwardly through an opening 69 in the cover 68. A plurality of flat pieces of cardboard or other filler members 71 may be vertically positioned in the hopper 67 and urged to the left in Fig. 1 by means of a weight 72 resting upon the inclined bottom 73 of the hopper 67. The filler members 71 are thereby individually positioned in the path of the feeding plunger 74 shown in nearly its lowermost position in Fig. 1. The plunger 74 is secured to a crosshead 76 mounted for reciprocation in a guide structure 77 secured to the cover member 68. The crosshead 76 and plunger 74 are reciprocated in a vertical direction by means of a connecting rod 79 having one end pivotally secured at 81 to the crosshead 76 and its other end pivotally secured at 82 to a crank 83 secured to a crankshaft 84 having one end journaled in the bracket 78 and its other end journaled in a bracket 86 secured to the auxiliary frame 21.

Figure 9:
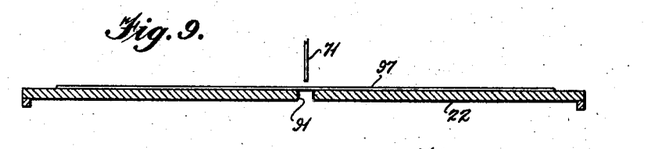
Figs. 9 to 13, inclusive, are fragmentary schematic views illustrating certain of the operations performed by the machine.
Figures 10, 11, 12:
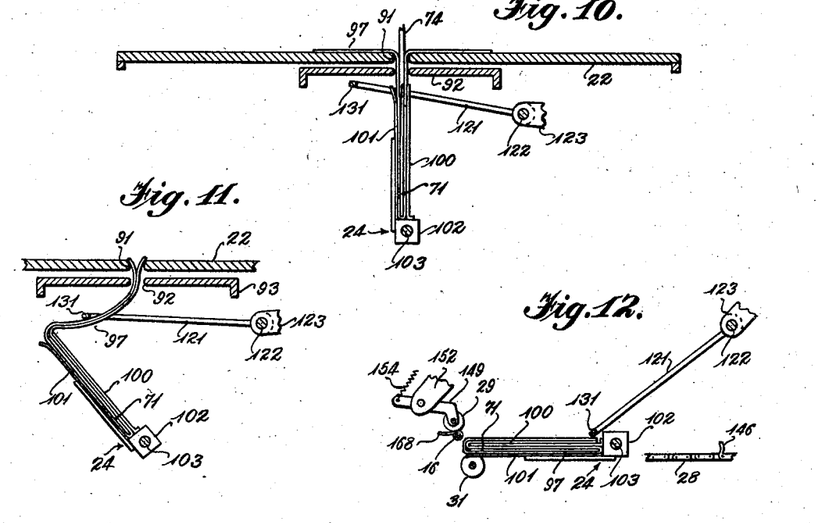

The crankshaft 84 is driven from the cam shaft 46 through a chain 87 engaging a sprocket 88 on the shaft 84 and the sprocket 89 on the shaft 46. It will be apparent that rotation of the shaft 84 and crank 83 will reciprocate the crosshead 76 and plunger 74 in a vertical direction and that on its downward stroke the plunger 74 will strip one of the filler members 71 from the hopper 67 and force the filler member downwardly through a slot 91 in the reciprocating table 22 and also through a slot 92 in the guide member 93 supported upon a longitudinally extending apertured member 94 secured to the frame 20. The filler members 71 are somewhat wider than the plunger member 74 and enter the guide structure 77 through an opening 96 so that a single filler member is stripped from the supply on each downward stroke of the plunger 74. As shown in Figs. 9 and 10, an elongated flexible article 97 positioned on the table 22 will be engaged by the filler member 71 and folded about the filler member, the filler member and folded portion of the article 97 being inserted into a resilient pocket 98 carried upon the folding turret 24. The table 22 is held stationary during actuation of the plunger 74 through the slot 91 thereof and during this time another article to be folded is being positioned upon the projecting portion of the table for the next folding operation. Resilient guide elements 99 (Fig. 6) secured to the guide member 93 prevent lateral displacement of the filler member during insertion into the pocket 98.

*Folding turret*

Figure 4:
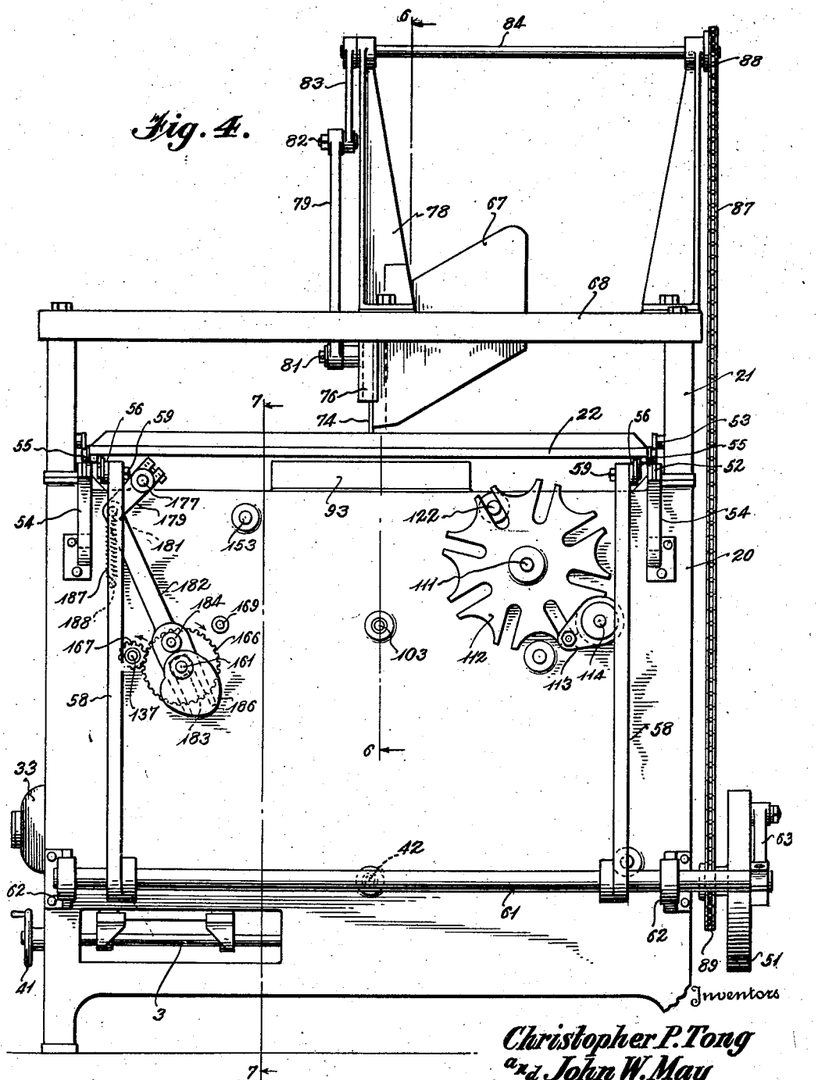
Fig. 4 is a side elevation of the machine.
Figure 5:
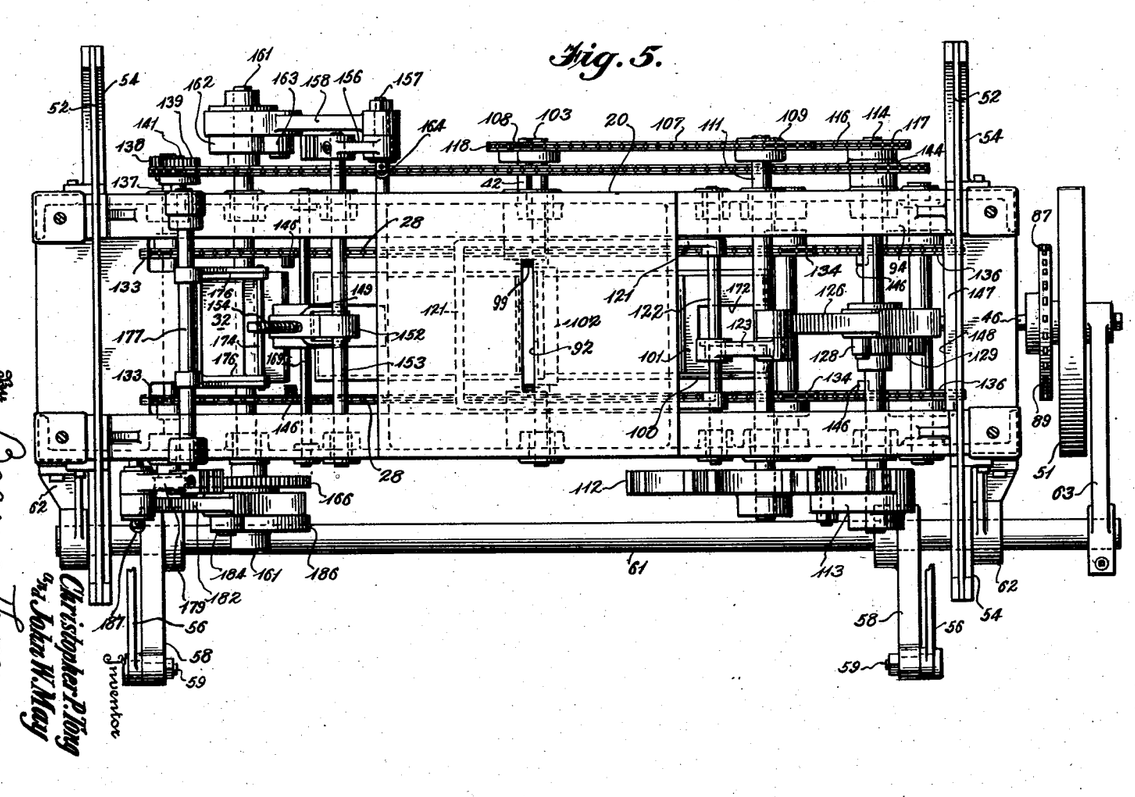
Fig. 5 is a horizontal section taken substantially on the line 5—5 of Fig. 1.

The pockets 98 of the folding turret 24 are formed by resilient members 100 and 101 suitably secured to an arbor 102 fixedly mounted on a turret shaft 103. The turret shaft 103 is journaled in the side portions of the frame as shown most clearly in Fig. 6 and is driven by a chain 107 (Figs. 1 and 5) engaging a sprocket 108 on the turret shaft 103 and a sprocket 109 on one end of a Geneva shaft 111 also journaled in the side members of the frame 20. The Geneva shaft 111 has a female Geneva member 112 secured to its opposite end (Figs. 4 and 5). The Geneva member 112 is intermittently rotated by means of a male Geneva member 113 secured to a shaft 114 also journaled in the side frame members and driven by a chain 116 engaging a sprocket 117 fixed on the shaft 114 and a sprocket 118 fixed on the main drive shaft 42. The folding turret 24 is thus rotated intermittently through 90° during periods when the plunger 74 is withdrawn from the pockets 98. As shown in Fig. 11 rotation of the turret 24 withdraws the remainder of the article from the table 22 through the slot 91 therein and through the slot 92 in guide member 93. The auxiliary folding mechanism 26 cooperates with the turret 24 in completing the folding operation upon the article 97.

Auxiliary folding mechanism

The auxiliary folding mechanism 26 includes a U-shaped bar 121 having its ends secured to a rock shaft 122 also journaled in the side members of the frame 20. The shaft 122 is oscillated to oscillate the U-shaped bar 121 through a lever arm 123 pivotally secured at 124 to a yoke member 126 guided by a block 127 on the shaft 114 and provided with a cam follower roller 128 engaging a cam 129 fixed on the shaft 114. It will be apparent that rotation of the shaft 114 will reciprocate the yoke member 126 to rock the shaft 122 and the U-shaped bar 121. As shown in Figs. 11 and 12, the U-shaped bar 121 is oscillated in timed relation with movement of the turret 24 so that the portion 131 of the bar 121 engages the article 97 to completely withdraw it from the table 22 and fold the portion of the article extending from the pocket 98 of the turret back against the pocket member 100. The folded article is then ready to be smoothed and discharged from the machine.

Discharge mechanism

The discharge mechanism includes a pair of flexible members such as chains 28 engaging drive sprockets 133 and idler sprockets 134 and 136. The drive sprockets 133 are secured to a cross shaft 137 journaled in the side portions of the frame and driven by a gear 138 (Figs. 5 and 7) secured to the shaft 137 and meshing with a gear 139 secured to a cross shaft 141 also journaled in the side portions of the frame 20. The shaft 141 is driven by a flexible member such as a chain 142 engaging a sprocket 143 on the shaft 141 and a sprocket 144 on the shaft 114 which is driven from the main drive shaft 42 as previously described.

The chains 28 have their upper flights running longitudinally of the machine substantially parallel with a pocket 98 of the turret 24 when the pocket is extended to the left in Fig. 1 and in the horizontal position. The chains 28 are provided with pusher members 146 extending upwardly and inwardly from the chains as shown in Figs. 1, 2 and 7. As also shown diagrammatically in Figs. 12 and 13, these pusher members 146 engage the corners of the filler members 71, the filler members 71 being wider than the pocket members 100 and 101 of the turret and also wider than the article folded thereabout. The pusher members 146 carry the folded article and filler member to the left in Figs. 1, 12 and 13 between the smoothing and pressing rollers 29 and 31 and into position for engagement by the discharge pusher member 32. The folded articles are supported after removal from the pocket 98 upon a plate 147 secured in the frame 20 and provided with an opening 148 for the turret 24 and other of the folding apparatus.

Figure 13:
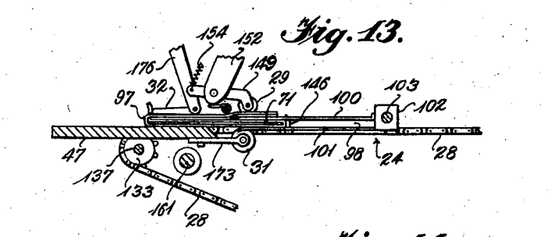
Figure 14:
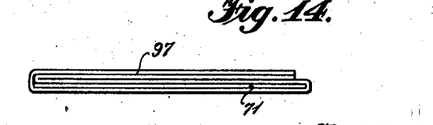
Fig. 14 is an enlarged view of the completely folded article as discharged from the machine.

It will be apparent that the position of the smoothing roller 29 shown in Figs. 1 and 13 would be in the path of the folded article during movement of a turret pocket from its vertical upright position to its horizontal position. Provision is, therefore, made for removing the roller 29 from the path of the folded article and this is accomplished by journaling the roller 29 in a rocker member 149 pivotally secured at 151 to a crank arm 152. The crank arm 152 is oscillated to the left in Fig. 1 in timed relation to the turret 24 by means of a lever arm 156 secured to the shaft 153 as shown in Figs. 8 and 3, the lever arm 156 having its free end pivotally secured at 157 to a yoke member 158 guided by a block 159 on a cam shaft 161. The cam shaft 161 is provided with a cam 162 secured thereto which engages a cam follower roller 163 journaled on the yoke member 158. The cam follower roller 163 is held against the cam 162 by means of a spring 164 secured to the pivot 157 (Figs. 8 and 6) and to the frame 20. The cam shaft 161 is driven through a gear 166 (Fig. 4) meshing with a pinion 167 secured to the cross shaft 137 upon which the sprockets 133 (Fig. 1) are received.

Figure 6:
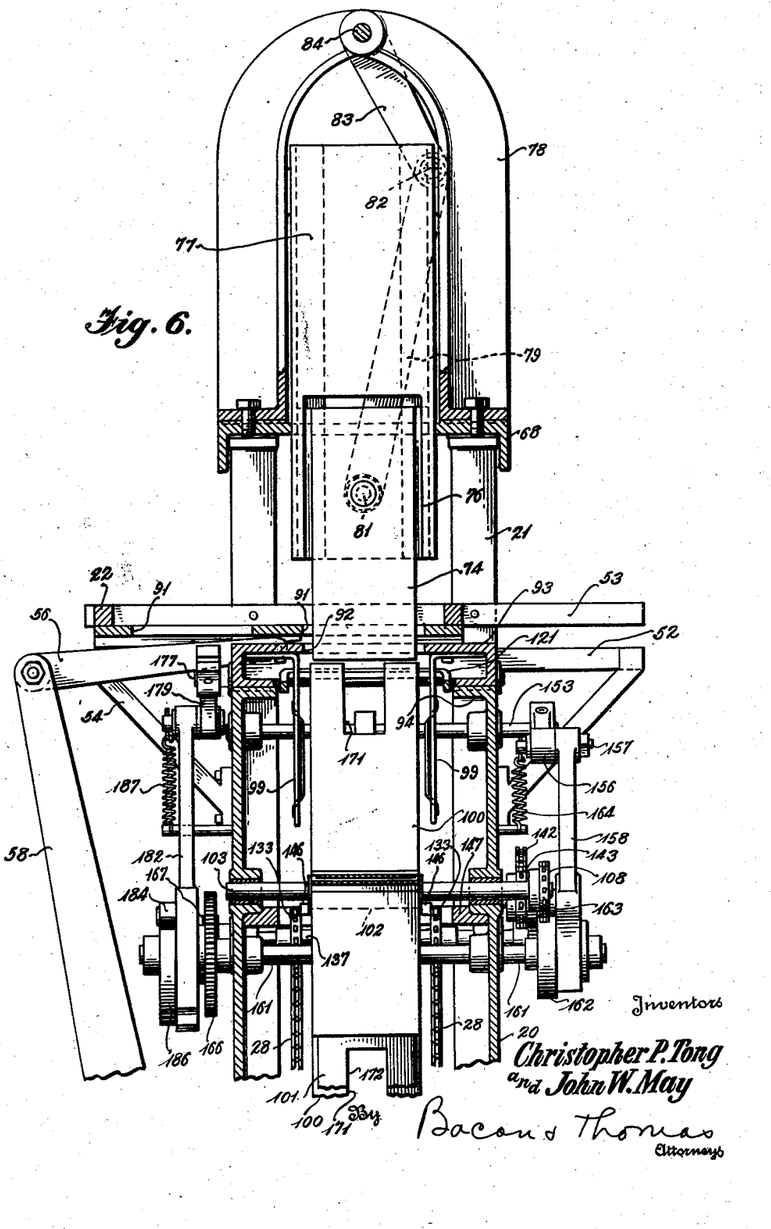
Fig. 6 is a partial vertical section taken on the line 6—6 of Fig. 4.

It will be apparent that rotation of the cam 162 of Fig. 8 will reciprocate the yoke member 158 to rock the shaft 153 carrying the crank arm 152, the contour of cam 162 being such that it rocks the crank arm 152 to the left in Fig. 1 to withdraw the roller 29 from the path of the folded article during movement of the turret 24. The roller 29 rides up on a guiding member 168 supported by a cross member 169 secured in the sides of the frame. As soon as the turret pocket 98 carrying a folded article assumes its horizontal position extending to the left in Fig. 1, the roller 29 is carried to the right in Fig. 1 so that the folded article is pressed between the rollers 29 and 31. As best shown in Fig. 6, the pocket members 100 and 101 are notched at 171 and 172, respectively, so that the roller 29 bears directly upon the folded article and the pocket members 100 and 101 clear the roller 31 during rotation of the turret 24, the roller 31 being journaled in a narrow bracket 173 secured to the plate 147 (Fig. 1).

As the folded material is carried between the rollers 31 and 29 it is compressed and smoothed and is then moved to the left in Fig. 13 so as to raise the discharge pusher member 32 which is pivoted at 174 to a crank arm 176 secured to a rocker shaft 177. As the trailing edge of the folded article is carried underneath the discharge pusher 32, this pusher drops downwardly behind the folded material and then is moved rapidly to the left by the lever arm 176 so as to discharge the article from the machine, for example onto a slide 178. The discharge pusher 32 preferably operates in timed relationship with the pushers on the chains 28 so that the pusher 32 moves the folded article away from the pushers 146 before the pushers 146 are carried around the sprockets 133 so as to prevent damage to the folded article.

The shaft 177 operating the levers 176 and pusher 32 is rocked by a cam mechanism shown most clearly in Fig. 4 and includes a lever arm 179 secured to the shaft 177 at one end and having its other end pivotally connected at 181 to a yoke member 182 guided by a block 183 on the shaft 161. The yoke member 182 is provided with a cam follower roller 184 engaging a cam 186 on the shaft 161, the cam follower roller 184 being held against the cam by a spring 187 having one end secured to the pivot 181 and the other end secured to the frame at 188. It will be apparent that rotation of the shaft 161 and cam 186 will reciprocate the yoke member 182 to rock the shaft 177 and thus rock the lever arm 176 (Fig. 1) and reciprocate the pusher 32 along the plate 147.

Operation

In operation the machine of the present invention is employed to fold elongated flexible articles. These articles are placed alternately on the opposite sides of the reciprocating table 22, shown in Figs. 1 and 6, so as to extend longitudinally of the table as shown in Fig. 9. The table occupies the position shown in Figs. 1 and 6 during one cycle of operation of the machine and during this time an operator places one article on the portion of the table extending to the left in Fig. 6. After the folding operation is completed by the machine the table 22 is reciprocated to the right in Figs. 2 and 6 by means of the link 56, crank arm 58, rock shaft 61, crank arm 63 and face cam 51. The article just placed on the table is then subjected to the folding operation while another article to be folded is placed on the portion of the table projecting from the right of the machine in Figs. 2 and 6. Thus the face cam 51 makes one revolution for every two folding operations of the machine.

A supply of filler members 71, such as cardboard, are positioned in the hopper 73, best shown in Fig. 1, and one at a time are stripped from the supply by means of the plunger 74 attached to the crosshead 76 which crosshead is reciprocated in a vertical direction by the connecting rod 79, crank 83 rotated by the shaft 84 which is in turn driven by the shaft 46 for the face cam 51 through the chain 87 and sprockets 88 and 89, the shaft 84 making two revolutions to each revolution of the shaft 46. The individual filler members 71 stripped from the supply by the plunger 74 are pushed downwardly into engagement with the article 97 to be folded (Figs. 9 and 10) and carry a fold of the article downwardly through slots 91 in the table 22 and 92 in a guide member 93 so as to insert the folded material into a resilient pocket 98 carried by a turret 24. The plunger is then withdrawn and reciprocated upwardly so as to pick up another filler member on its next downward stroke. When the plunger has been withdrawn from the pocket 98 of the turret 24, the turret 24 is rotated in a counterclockwise direction in Fig. 1 through 90° by means of a chain 107 engaging the sprocket 108 on the turret shaft 103 which chain also engages a sprocket 109 on the cross shaft 111 intermittently rotated by a Geneva mechanism shown in Fig. 4. The Geneva movement includes a female Geneva member 112 and a male Geneva member 113 secured to a shaft 114 driven by a chain 116 engaging a sprocket on the shaft 114 and also a sprocket on the main drive shaft 42. This positions another pocket 98 on the turret for reception of another folded article.

During the rotation of the turret 24 the resilient members 100 and 101 forming the pocket 98 grip the partly folded article containing the filler and, as shown in Figs. 11 and 12, the remainder of the article being folded is drawn through the slots 91 and 92 and folded back against the resilient pocket member 100 by means of a U-shaped member 121. As soon as the pocket members 100 and 101 have moved sufficiently far to clear the member 121, this member is oscillated downwardly as shown in Figs. 11 and 12 by the mechanism shown in Fig. 1, including a crank arm 123, a yoke member 126, having a cam follower roller 128 engaging the cam 129 on the shaft 114. The gear ratios and timing are such that the folding member 121 is oscillated downwardly for each quarter revolution of the turret and returned to the position shown in Fig. 1 for the next folding operation. As shown in Fig. 12, the folding member 131 positions a portion of the article outside of the pocket 98 against the pocket member 100.

During rotation of the turret 24 the roller 149 is moved out of the way of the folded article, the roller 29 being journaled in a rocker member 149 pivotally connected to the lever arm 152 mounted on the shaft 53 which is oscillated by the cam mechanism shown in Fig. 8. This cam mechanism includes a rocker arm 156 secured to the shaft 153, a yoke member 158 pivotally connected to the rocker 156 which yoke member is reciprocated by a cam 162 on the came shaft 161 through a cam follower roller 163. The cam shaft 161 is driven from shaft 137 through the gears 166 and 167 shown in Fig. 4 and secured to the shafts 161 and 137, respectively. As soon as the turret pocket containing the folded article is positioned horizontally so as to extend toward the left in Fig. 1 the roller 29 is returned to the position shown in Fig. 1 so as to press the folded article between the roller 29 and the roller 31 by action of the spring 154. The pocket members 100 and 101 are notched so that the roller 29 can engage the folded article and so that the pocket members clear the roller 31 and its bracket 173 when the turret is rotated.

Pushers or hook members 146 on the laterally spaced chains 28 engage the corners of the filler member which is wider than the pocket members 100 and 101 and also wider than the folded article, to push the folded article between the rollers 29 and 31 as shown in Fig. 13. The chains 28 are continuously driven from the shaft 114 through chain 142 and gears 138 and 139 on shafts 137 and 141, respectively, the sprockets 133 engaging the chains 28 also being secured to shaft 137. The folded article is smoothed and compressed by the rollers 29 and 31 as it is moved out of the pocket 98 and is carried beneath the pivoted pusher member 32 which drops behind the folded article and then discharges the folded article from the machine. Pusher member 32 is moved to the right in Fig. 1 for this operation by the lever arms 156 secured to shaft 177 which is rocked by the cam mechanism shown in Fig. 1, including the crank arm 179 secured to the shaft 177 and a yoke member 182 which is reciprocated by the cam 186 secured to the shaft 161 engaging a cam follower roller 189 on the yoke member 182. The pusher member 32 preferably engages the folded article while still being pushed by the pusher members 146 and prior to carrying of these pusher members around the sprockets 133. The mechanism illustrated will fold elongated flexible articles around a filler member as fast as two operators can position the articles upon the reciprocating table 22. The operating speed of the machine can be adjusted by the hand wheel 41 so as to accommodate the operation of the machine to the skill of the operators and irrespective of the speed of operation of the machine the articles will be smoothly folded for packaging either in individual packages or in packages containing a plurality of folded articles.

While we have disclosed the preferred embodiment of our invention, it is understood that the details thereof may be varied within the scope of the following claims.

We claim:

1. In a machine for folding elongated flexible articles, the combination of a laterally reciprocable feed table for receiving said articles, said table having a slot therein extending in the direction of reciprocation, a plunger member for forcing a fold of the article through said slot and means for receiving said fold and withdrawing the remainder of said article from said table through said slot, said table being of sufficient dimension in the direction of its reciprocation so that an article can be positioned on one portion of the table while an article is being folded and removed from another portion of the table.

2. In a folding machine for folding elongated flexible articles, a laterally movable feed table for receiving articles to be folded, said table having a slot extending in the direction of movement thereof, a turret member having a plurality of pockets for receiving a fold of said article, means for forcing a fold in a portion of said article through said slot and inserting the same into one of said pockets, means for rotating said turret after said fold has been inserted in said pocket to move said pocket to a discharge position, and means for removing the folded article from said pocket, said table being of sufficient dimension in the direction of its movement so that an article can be positioned on one portion of the table while an article is being folded and removed from another portion of the table.

3. In a folding machine for folding elongated flexible articles, a turret member having a plurality of pockets therein, means for engaging a filler member with the article to be folded so as to form a fold of the article about said filler member and insert said filler member and fold into one of said pockets in one position of said turret, at least one wall of said pocket being of resilient material so as to grip said fold, means for rotating said turret and means cooperating with said turret during rotation thereof for folding the remaining portion of said article and means engaging said filler member for removing the folded article from said pocket, said removing means including a flexible chain provided with projecting members engaging said filler member to remove the folded article containing said filler member from said pocket and a supplemental pusher member for engaging the folded article and removing the same from contact with said projecting members on said chain.

4. In a machine for folding elongated flexible articles, a movable member provided with a pocket, said movable member having a plate element forming one side of said pocket so as to have an external surface extending substantially parallel with an internal side surface of said pocket, means for forming a fold in a portion of said article and inserting said fold into said pocket, means for moving said movable member to move said pocket to a discharge position, means cooperating with said movable member to fold the remainder of said article about said plate element, said last named means including a folding element movable along said external surface and means to move said folding element in timed relation with the movement of said movable member, and means for removing the folded article from said movable member.

5. In a machine for folding elongated flexible articles, a movable member provided with a pocket, said movable member having a plate element forming one side of said pocket so as to have an external surface extending substantially parallel with an internal side surface of said pocket, means for feeding a filler member against said article intermediate its ends to form a fold in a portion of said article about said filler member and insert said fold and filler member into said pocket, said pocket having a resilient member for gripping said fold, means for moving said movable member to move said pocket to a discharge position, means cooperating with said movable member during movement thereof to fold the remainder of said article about said plate element, said last named means including a folding element movable along said external surface and means to move said folding element in timed relation with the movement of said movable member, and means engaging said filler member for removing the folded article from said movable member.

6. In a machine for folding elongated flexible articles, a table for supporting an article to be folded, said table being provided with a slot intermediate its ends, a movable member positioned below said table and provided with a pocket registering with said slot in one position of said movable member, means for forming a fold in a portion of said article through said slot and into said pocket, means for moving said movable member to move said pocket to a discharge position and withdraw the remainder of said article through said slot, means cooperating with said movable member to fold said remainder of said article and means for removing the folded article from said movable member, said table being laterally movable and being of sufficient width to provide for placing an article to be folded on one lateral portion of the table while another article is being folded and removed from another lateral portion of said table.

7. In a machine for folding elongated flexible articles, a table for supporting an article to be folded, said table being provided with a slot intermediate its ends, a movable member below said table and provided with a plurality of pockets each registering with said slot in one position of said movable member, means registering with said slot for feeding a filler member through said slot to engage and fold an intermediate portion of said article about said filler member and insert said fold and filler member into one of said pockets, each of said pockets having a resilient wall for gripping said fold, means for intermittently moving said movable member to move said one pocket to remove the remainder of said article from said table through said slot, means cooperating with said movable member during movement thereof to fold the remainder of said article and means for removing the folded article from said movable member at another position of said one pocket, said table being laterally movable and being of sufficient width to provide for placing an article to be folded on one lateral portion of the table while another article is being folded and removed from another lateral position of said table, and means for intermittently moving said table from one lateral position to another lateral position.

8. In a machine for folding elongated flexible articles, a turret member provided with a pocket, said turret having a substantially radially extending plate forming one side of said pocket, means for supporting said article, means for feeding a filler member to form a fold in a portion of said article about said filler member and insert said fold and said filler member into said pocket, means for rotating said turret member to move said pocket to a discharge position, folding means movable generally radially of said turret member during movement thereof along said plate member to fold the remainder of said article about said plate member, and means for moving said folding member in timed relation with said turret member.

9. In a machine for folding elongated flexible articles, a movable member provided with a pocket, means for supporting said article, means for feeding a filler member to form a fold in a portion of said article about said filler member and insert said fold and said filler member into said pocket, means for moving said movable member to move said pocket to a discharge position, means cooperating with said movable member during movement thereof to fold the remainder of said article, and means for removing the folded article from said movable member, said removing means including endless chains having portions extending parallel to the walls of said pocket when said pocket is in said discharge position and projecting elements on said chains for engaging said filler member and removing the same with said article from said pocket, and oscillating pusher members for engaging said article while still in contact with said projecting members for discharging the folded article from said machine.

10. In a machine for folding elongated flexible articles, a movable member provided with a pocket, means for supporting said article, means for feeding a filler member to form a fold in a portion of said article about said filler member and insert said fold and said filler member into said pocket, means for moving said movable member to move said pocket to a discharge position, means cooperating with said movable member during movement thereof to fold the remainder of said article, and means for removing the folded article from said movable member, said removing means including endless chains having portions extending parallel to the walls of said pocket when said pocket is in said discharge position and projecting elements on said chains for engaging said filler member and removing the same with said article from said pocket, and oscillating pusher members for engaging said article while still in contact with said projecting members for discharging the folded article from said machine, and means for smoothing said folded article during removal from said pocket by said projecting members.

11. In a machine for folding elongated flexible articles, a movable member provided with a pocket, means for supporting said article, means for feeding a filler member to form a fold in a portion of said article about said filler member and insert said fold and said filler member into said pocket, means for moving said movable member to move said pocket to a discharge position, means cooperating with said movable member during movement thereof to fold the remainder of said article, and means for removing the folded article from said movable member, said removing means including endless chains having portions extending parallel to the walls of said pocket when said pocket is in said discharge position and projecting elements on said chains for engaging said filler member and removing the same with said article from said pocket, and oscillating pusher members for engaging said article while still in contact with said projecting members for discharging the folded article from said machine, and means for smoothing said folded article during removal from said pocket by said projecting members, said smoothing means including rollers resiliently engaging opposite sides of said folded article.

CHRISTOPHER P. TONG.
JOHN W. MAY.